(12) United States Patent
Yamashita et al.

(10) Patent No.: US 8,977,083 B2
(45) Date of Patent: Mar. 10, 2015

(54) PHOTO MODULE

(75) Inventors: Yuto Yamashita, Sendai (JP); Etsuo Ogino, Sendai (JP); Keiichi Sasaki, Sendai (JP)

(73) Assignee: Kitanihon Electric Cable Co., Ltd, Miyagi (JP)

(*) Notice: Subject to any disclaimer, the term of this patent is extended or adjusted under 35 U.S.C. 154(b) by 0 days.

(21) Appl. No.: 14/113,828

(22) PCT Filed: Apr. 3, 2012

(86) PCT No.: PCT/JP2012/059060
§ 371 (c)(1),
(2), (4) Date: Oct. 25, 2013

(87) PCT Pub. No.: WO2013/011720
PCT Pub. Date: Jan. 24, 2013

(65) Prior Publication Data
US 2014/0112620 A1    Apr. 24, 2014

(30) Foreign Application Priority Data
Jul. 15, 2011    (JP) .................................. 2011-157024

(51) Int. Cl.
*G02B 6/32* (2006.01)
*G02B 6/42* (2006.01)

(52) U.S. Cl.
CPC ................ *G02B 6/32* (2013.01); *G02B 6/4206* (2013.01)
USPC ............................................. 385/34; 385/49

(58) Field of Classification Search
CPC ........... G02B 6/30; G02B 6/4206; G02B 6/43
USPC ..................................................... 385/34, 49
See application file for complete search history.

(56) References Cited

U.S. PATENT DOCUMENTS

| 5,221,839 | A | 6/1993 | Braun |
| 7,031,567 | B2 * | 4/2006 | Grinderslev et al. ........... 385/34 |

FOREIGN PATENT DOCUMENTS

| GB | 2253073 A | 8/1992 |
| JP | 02141709 | 5/1990 |
| JP | 07174904 | 7/1995 |
| JP | 2001124960 A | 5/2001 |
| JP | 2001296446 | 10/2001 |

(Continued)

OTHER PUBLICATIONS

English translation of International Preliminary Report on Patentability dated Jan. 30, 2014 corresponding to PCT/JP2012/059060, 2 pp.
English translation of Written Opinion of the International Searching Authority dated May 29, 2012 corresponding to PCT/JP2012/059060, 6 pp.

(Continued)

*Primary Examiner* — Ryan Lepisto
(74) *Attorney, Agent, or Firm* — Ohlandt Greeley Ruggiero & Perle L.L.P.

(57) ABSTRACT

The photo module is provided with an incident light fiber guiding light, a gradient index lens having an optical axis different from the incident light fiber, having a period length larger than a ¼ period length and smaller than a ½ period length with respect to the wavelength of the incident light, joined to the incident light fiber on a surface forming a finite angle with a surface vertical to the optical axis, and having, as a light exit surface of emitting light, a surface substantially vertical to the optical axis, and a light receiving element disposed at a position where the emitting light is collected and measuring the strength of the emitting light.

1 Claim, 4 Drawing Sheets

(56) References Cited

FOREIGN PATENT DOCUMENTS

| | | |
|---|---|---|
| JP | 2001296446 A | 10/2001 |
| JP | 2001124960 | 11/2001 |

OTHER PUBLICATIONS

English translation of International Search Report dated May 29, 2012 corresponding to PCT/JP2012/059060, 5 pp.

* cited by examiner

PHOTO MODULE

BACKGROUND

1. Field of the Disclosure

The present disclosure relates to a photo module which measures a signal strength in a transmission path, and this technique collects, on a light receiving element, signal light guided to a gradient index lens in the photo module and, at the same time, prevents reflected light returned from the gradient index lens in the photo module from entering into the transmission path again.

2. Discussion of the Background Art

There is a photo module which measures the signal strength in the transmission path and thereby monitors a communication state in the transmission path (for example, see Patent Literature 1).

A line monitor disclosed in Patent Literature 1 is constituted of an incident light fiber, an emitting light fiber, a rod lens, a reflection coating including a light transmitting portion, and a light receiving/detecting element. An optical signal guided from the transmission path reaches the reflection coating through the incident light fiber and the rod lens. The optical signal having reached the light transmitting portion of the reflection coating is detected by the light receiving/detecting element. The optical signal having reached the light transmitting portion of the reflection coating is output to the transmission path through the rod lens and the emitting light fiber.
Patent Literature 1: Japanese Patent Application Laid-Open No. 2-141709

As described above, in Patent Literature 1, with the provision of the emitting light fiber and the reflection coating, some of the optical signals guided from the transmission path are detected by the light receiving/detecting element, and the remaining portions of the optical signal are output to the transmission path. It is considered that all the optical signals guided from the transmission path are detected by the light receiving/detecting element, without providing the emitting light fiber and the reflection coating, in application of Patent Literature 1.

FIG. 1 shows a configuration of a photo module of a conventional technique. This photo module of the conventional technique is constituted of an incident light fiber 1, a gradient index lens 2, and a light receiving element 3. The incident light fiber 1 guides incident light. The gradient index lens 2 is joined to an exit light end of the incident light fiber 1, has an optical axis 21 different from the incident light fiber 1, has a ¼ period length with respect to the wavelength of the incident light, and has both end surfaces substantially vertical to the optical axis 21. The light receiving element 3 is disposed at an optical path position of the emitting light from the gradient index lens 2 and measures the strength of the emitting light from the gradient index lens 2.

An optical path of an optical signal in the photo module of the conventional technique will be described. The optical signal from the transmission path is guided on an optical path A in the incident light fiber 1 and reaches a point 22 deviated from the optical axis 21 in the gradient index lens 2. Since the period length of the gradient index lens 2 is a ¼ period length with respect to the wavelength of the incident light, the optical signal having reached the point 22 is guided on an optical path B and reaches a point 23 on the optical axis 21 in the gradient index lens 2. The optical signal having reached the point 23 is guided on the optical path C and reaches a point 31 in the light receiving element 3.

The optical path of the optical signal has some degree of spread. The optical signals having reached the point 22 are guided on optical paths B-1 and B-2 deviated by the spread from the optical path B and reach the respective points 25 and 26 deviated by the spread from the point 23 in the gradient index lens 2. Since the period length of the gradient index lens 2 is the ¼ period length with respect to the wavelength of the incident light, the optical signals having reached the points 25 and 26 are guided respectively on optical paths C-1 and C-2 parallel to an optical path C and reach points 32 and 33 deviated by the spread from the point 31 in the light receiving element 3. Accordingly, in the photo module of the conventional technique, the signal light is less likely to be collected by the light receiving element 3.

Some of the optical signals having reached the points 23, 25, and 26 are transmitted toward the light receiving element 3, and the remaining signals are reflected toward the incident light fiber 1. Since the period length of the gradient index lens 2 is the ¼ period length with respect to the wavelength of the incident light, the optical signals reflected by the points 23, 25, and 26 are guided respectively on optical paths D, D-1, and D-2 and collected at the point 24 in the gradient index lens 2. The points 22 and 24 are placed at symmetrical positions with respect to the optical axis 21. The optical signals reflected by the point 24 are guided on optical paths D, D-1, and D-2 and reach the points 23, 25, and 26 in the gradient index lens 2. The optical signals reflected by the points 23, 25, and 26 are guided on the optical paths B, B-1, and B-2 and collected at the point 22 in the gradient index lens 2. Accordingly, in the photo module of the conventional technique, the optical signal easily enters the incident light fiber 1 again because of multiple reflections in the gradient index lens 2.

In order to prevent the optical signal from being made enter the incident light fiber 1 again by being reflected at the points 22 and 24 and the points 23, 25, and 26, it is considered that end surface on the side of the points 22 and 24 and the end surface on the side of the points 23, 25, and 26 of the gradient index lens 2 are subjected to not substantially right angle polishing but bevel polishing, and an antireflection coating is provided on a substantially right angle polishing surface. However, application of the bevel polishing and provision of the antireflection coating increase the number of the manufacturing processes and the cost.

In order to solve the above problem, the present disclosure provides a photo module which measures a signal strength in a transmission path, and this technique collects a signal light, guided to a gradient index lens, on a light receiving element without increasing the number of manufacturing processes and the cost and, at the same time, prevents reflected light returned from the gradient index lens from entering inside the transmission path again.

SUMMARY

In order to achieve the above object, the optical axis of the gradient index lens is differed from the optical axis of the incident light fiber, a period length of the gradient index lens is rendered larger than a ¼ period length and smaller than a ½ period length with respect to the wavelength of the incident light, and while an incident end surface of both end surfaces of the gradient index lens is subjected to bevel polishing, a light exit end surface of them is subjected to substantially right angle polishing.

More specifically, the present disclosure provides a photo module provided with an incident light fiber guiding incident light and a gradient index lens having an optical axis different from the incident light fiber, having a period length larger than a ¼ period length and smaller than a ½ period length with respect to the wavelength of the incident light, joined to the incident light fiber on a surface forming a finite angle with a surface vertical to the optical axis, and having, as a light exit surface of emitting light, a surface substantially vertical to the optical axis.

The present disclosure provides a photo module further provided with a light receiving element disposed at a position where the emitting light is collected and measuring the strength of the emitting light and a light receiving element sealing window material disposed between the gradient index lens and the light receiving element and joined to the gradient index lens on a surface substantially vertical to the optical axis.

According to the above constitution, a spread of an optical path of an optical signal is collected in a direction toward the light receiving element at an end of the gradient index lens on the light receiving element side. The spread of the optical path of the optical signal is different from that of the conventional technique and thus is not collected at the end of the gradient index lens on the incident light fiber side.

In order to prevent reflection of the optical signal to the incident light fiber, it is preferable that bevel polishing is applied at the end of the gradient index lens on the incident light fiber side; however, the period length of the gradient index lens is adjusted at the end of the gradient index lens on the light receiving element side, whereby bevel polishing is not required to be applied, and it is adequate to apply substantially right angle polishing. Further, when the substantially right angle polishing is applied at the end of the gradient index lens on the light receiving element side, the effect of enhancing a collection efficiency can be expected on a light receiving surface of the light receiving element in comparison with a case where bevel polishing is applied.

Thus, the signal light guided to the gradient index lens is collected to the light receiving element without increasing the number of manufacturing processes and the cost, and the reflected light returned from the gradient index lens can be prevented from entering inside the transmission path again.

ADVANTAGEOUS EFFECTS OF DISCLOSURE

The present disclosure can provide a photo module which measures a signal strength in a transmission path, and this technique collects signal light, guided to a gradient index lens, to a light receiving element without increasing the number of manufacturing processes and the cost and, at the same time, prevents reflected light returned from the gradient index lens from entering inside the transmission path again.

DETAILED DESCRIPTION OF THE PREFERRED EMBODIMENT

Figure 1:
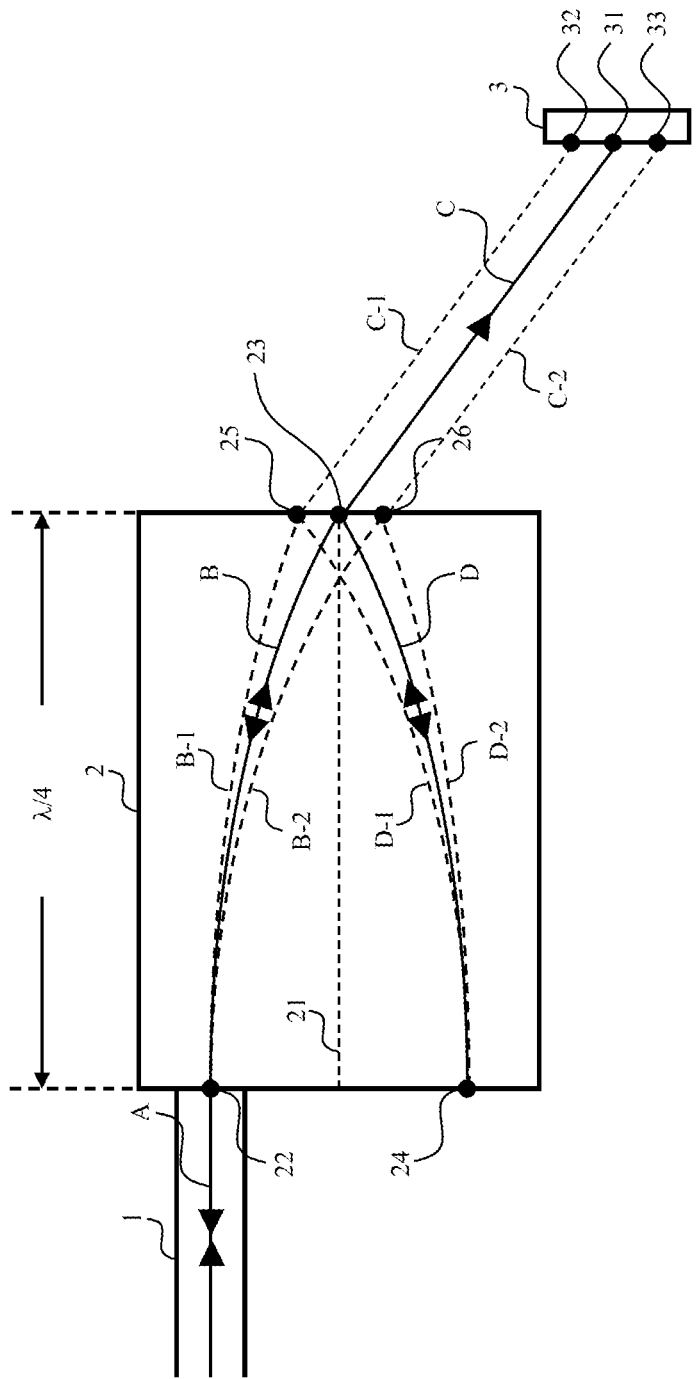
FIG. 1 is a view showing a configuration of a photo module of a conventional technique.

An embodiment of the present disclosure will be described with reference to the accompanying drawings. The embodiment to be described hereinafter is an example of the present disclosure, and the present disclosure is not limited to the following embodiment. Components denoted by the same reference numerals in the present specification and the drawings mutually denote the same components.

(Configuration of Photo Module)

Figure 2:
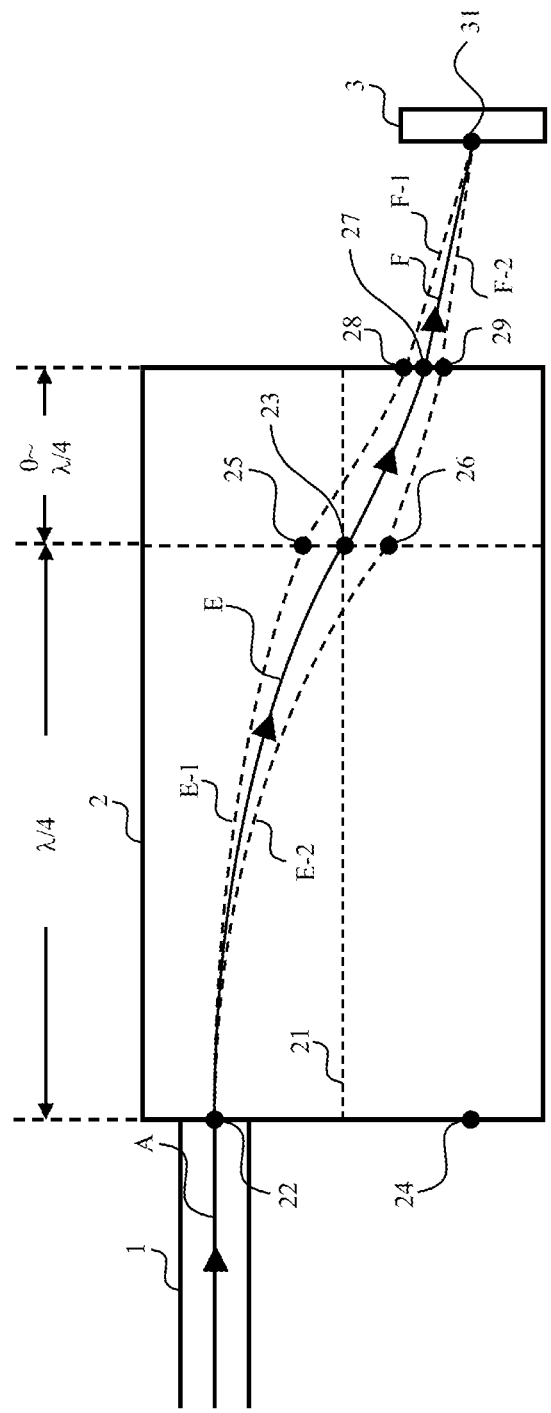
FIG. 2 is a view showing a configuration of a photo module of the present disclosure.

A configuration of a photo module of the present disclosure is shown in FIG. 2. The photo module of the disclosure is provided with an incident light fiber 1, a gradient index lens 2, and a light receiving element 3. The incident light fiber 1 guides incident light. The gradient index lens 2 is joined to a light exit end of the incident light fiber 1, has an optical axis 21 different from the incident light fiber 1, and has a period length larger than a ¼ period length and smaller than a ½ period length with respect to the wavelength of the incident light. The gradient index lens 2 is joined to the incident light fiber 1 on a surface forming a finite angle with a surface vertical to the optical axis 21 and has, as a light exit surface of emitting light, a surface substantially vertical to the optical axis 21. The light receiving element 3 is disposed at a position where the emitting light from the gradient index lens 2 is collected and measures the strength of the emitting light from the gradient index lens 2. "Substantially verticality (substantially right angle)" is a concept including a tolerance for verticality (right angle).

The optical path of the optical signal in the photo module of the present disclosure will be described. The optical signal from the transmission path is guided on the optical path A in the incident light fiber 1 and reaches the point 22 deviated from the optical axis 21 in the gradient index lens 2. Since the period length of the gradient index lens 2 is larger than the ¼ period length and smaller than the ½ period length with respect to the wavelength of the incident light, the optical signal having reached to the point 22 is guided on an optical path E, reaches the point 23 on the optical axis 21 in the ¼ period length from an end on the incident light fiber 1 side, and reaches a point 27 deviated from the optical axis 21 at an end on the light receiving element 3 side in the gradient index lens 2. The optical signal having reached the point 27 is guided on an optical path F and reaches a point 31 in the light receiving element 3.

The optical path of the optical signal has some degree of spread. The optical signals having reached the point 22 are guided on optical paths E-1 and E-2 deviated by the spread from the optical path E, reach the points 25 and 26 deviated by the spread from the point 23 in the ¼ period length from the end on the incident light fiber 1 side, and reach points 28 and 29 deviated by the spread from the point 27 at the end of the light receiving element 3 side in the gradient index lens 2. Since the period length of the gradient index lens 2 is larger than the ¼ period length and smaller than the ½ period length with respect to the wavelength of the incident light, the optical signals having reached the points 28 and 29 are guided respectively on optical paths F-1 and F-2, which are closer to an optical path F toward the light receiving element 3, and reach the point 31 in the light receiving element 3. Accordingly, in the photo module of the present disclosure, the signal light is easily collected by the light receiving element 3.

Some of the optical signals having reached the points 27, 28, and 29 are transmitted toward the light receiving element 3, and the remaining signals are reflected toward the incident light fiber 1. Since the period length of the gradient index lens 2 is larger than the ¼ period length and smaller than the ½ period length with respect to the wavelength of the incident light, the optical signals reflected by the points 27, 28, and 29 are not collected at the points 22 and 24 in the gradient index lens 2. The points 22 and 24 are placed at symmetrical positions with respect to the optical axis 21. Accordingly, in the photo module of the present disclosure, the optical signal is less likely to enter the incident light fiber 1 again even if there are multiple reflections in the gradient index lens 2.

At an end of the gradient index lens 2 on the incident light fiber 1 side, in order to prevent the optical signal from being reflected from the optical path A to the optical path A, it is preferable to apply bevel polishing in which a surface forming a finite angle with a surface vertical to the optical axis 21 is a joint surface with the incident light fiber 1. However, at an end of the gradient index lens 2 on the light receiving element 3 side, although the optical signals are reflected at the points 27, 28, and 29, the optical signals are scarcely reflected to the optical path A; therefore, the application of the bevel polishing in which the surface forming a finite angle with the surface vertical to the optical axis 21 is a light exit surface of emitting light is not required, and it is adequate to apply substantially right angle polishing in which a surface substantially vertical to the optical axis 21 is the light exit surface of the emitting light. Further, when the substantially right angel polishing is applied at the end of the gradient index lens 2 on the light receiving element 3 side, in comparison with a case where the bevel polishing is applied, the effect of enhancing a collection efficiency can be expected on a light receiving surface of the light receiving element 3.

In this embodiment, although the period length of the gradient index lens 2 is larger than the ¼ period length and smaller than the ½ period length with respect to the wavelength of the incident light, with n being a natural number as a variation, the period length of the gradient index lens 2 may be larger than a (¼+n/2) period length and smaller than a (½+n/2) period length with respect to the wavelength of the incident light. However, in order to reduce the size of the photo module and the cost, the period length of the gradient index lens 2 is preferably larger than the ¼ period length and smaller than the ½ period length with respect to the wavelength of the incident light.

(Configuration of Array Type Photo Module)

Figure 3:
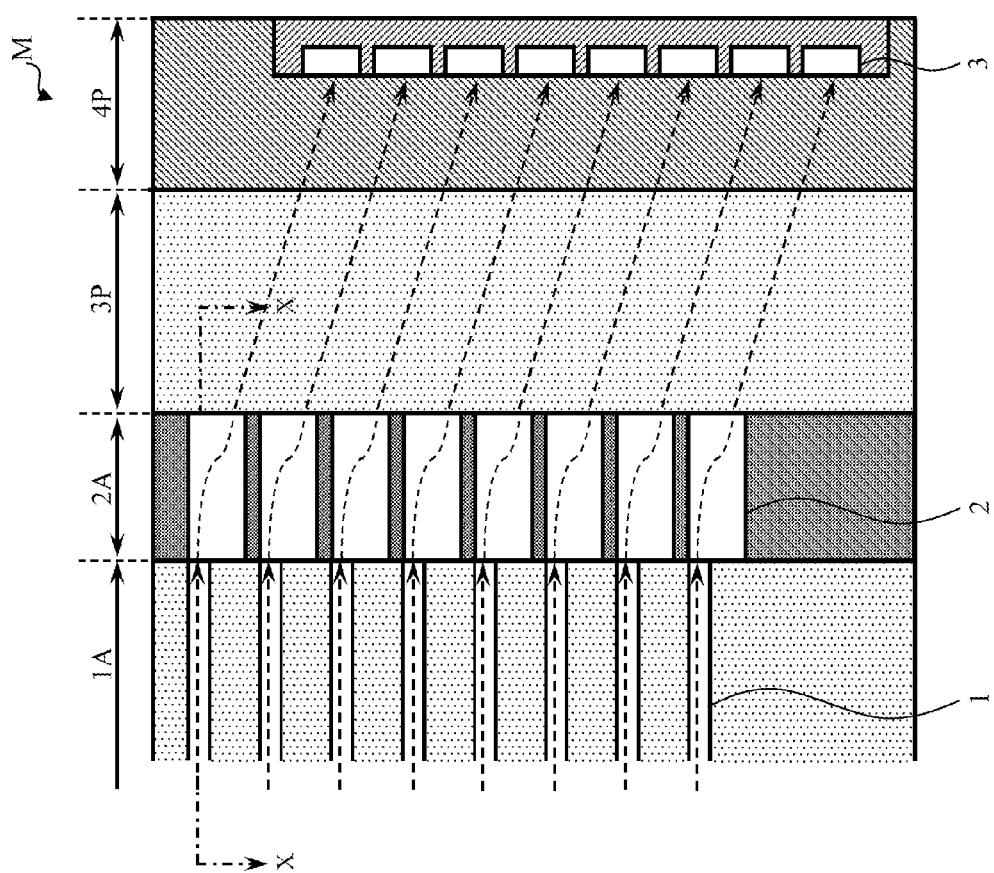
FIG. 3 is a view showing a configuration of an array type photo module of the present disclosure.

A configuration of an array type photo module of this disclosure is shown in FIG. 3. An array type photo module M is provided with an incident light fiber array 1A, a gradient index lens array 2A, a light receiving element sealing window material package 3P, and a light receiving element package 4P.

The incident light fiber array 1A has the incident light fiber 1 in each channel. The gradient index lens array 2A has the gradient index lens 2 in each channel. The light receiving element sealing window material package 3P is disposed between the gradient index lens array 2A and the light receiving element package 4P and has transmission media of the optical paths F, F-1, and F-2 in each channel. The light receiving element package 4P has the light receiving element 3 in each channel.

Figure 4:
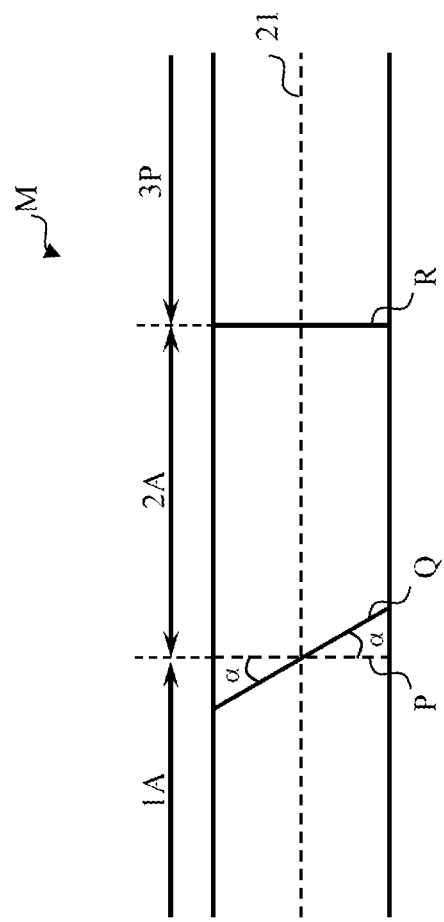
FIG. 4 is a view showing an X-X arrowed cross-section of the array type photo module of the present disclosure.

An X-X arrowed cross-section of the array type photo module of the present disclosure is shown in FIG. 4. The X-X arrowed cross-section of FIG. 4 is a cross section in which the incident light fiber 1 and the gradient index lens 2 are cut in each channel. Bevel polishing in which a surface Q forming a finite angle (α) with a surface P vertical to the optical axis 21 is a joint surface with the incident light fiber 1 is applied at the end of the gradient index lens 2 on the incident light fiber 1 side. Accordingly, at an end of the incident light fiber 1 on the gradient index lens 2 side, bevel polishing in which the surface Q forming a finite angle (−α) with the surface P vertical to the optical axis 21 is a joint surface with the gradient index lens 2 is applied. At the end of the gradient index lens 2 on the light receiving element 3 side, substantially vertical polishing in which a surface R substantially vertical to the optical axis 21 is a light exit surface of emitting light is applied. Accordingly, at an end of the light receiving element sealing window material package 3P on the gradient index lens 2 side, substantially right angle polishing in which the surface R substantially vertical to the optical axis 21 is a joint surface with the gradient index lens 2 is applied. In the bevel polishing described above, the end of the gradient index lens 2 on the incident light fiber 1 side may be the finite angle (−α) with the surface P vertical to the optical axis 21, and the end of the incident light fiber 1 on the gradient index lens 2 side may be the finite angle (α) with the surface P vertical to the optical axis 21.

In the incident light fiber 1 of the incident light fiber array 1A, the gradient index lens 2 of the gradient index lens array 2A, and the light receiving element 3 of the light receiving element package 4P, the direction and interval of the arrangement are the same, and light guide directions are arranged in a line in parallel in each channel. According to this constitution, the array type photo module M can be manufactured easily and at low cost and, in addition, can realize a high density array.

Industrial Applicability

The photo module according to the present disclosure can be used when a signal strength in a transmission path is measured regardless of whether a single or a plurality of channels is used.

Reference Signs List

1: Incident light fiber
2: Gradient index lens
3: Light receiving element
M: Array type photo module
1A: Incident light fiber array
2A: Gradient index lens array
3P: Light receiving element sealing window material package
4P: Light receiving element package

The invention claimed is:
1. A photo module comprising:
an incident light fiber guiding incident light; and
a gradient index lens having an optical axis different from the incident light fiber, having a period length larger than a ¼ period length and smaller than a ½ period length with respect to a wavelength of the incident light, joined to the incident light fiber on a surface forming a finite angle with a surface vertical to the optical axis, and having, as a light exit surface of emitting light, a surface substantially vertical to the optical axis;
a light receiving element disposed at a position where the emitting light is collected and measuring the strength of the emitting light; and
a light receiving element sealing window material disposed between the gradient index lens and the light receiving element and joined to the gradient index lens on a surface substantially vertical to the optical axis.

* * * * *